United States Patent Office 2,773,104
Patented Dec. 4, 1956

2,773,104

MANUFACTURE OF HEXACHLOROBENZENE

Waldo B. Ligett, Berkley, Mich., assignor to Ethyl Corporation, New York, N. Y., a corporation of Delaware No Drawing. Application June 30, 1951,
Serial No. 234,673

11 Claims. (Cl. 260—650)

This invention relates to a process for the manufacture of hexachlorobenzene. In particular my invention relates to the formation of the aromatic hexachlorobenzene by chlorination of the cycloaliphatic compound benzene hexachloride.

Prior to my discovery, methods for the manufacture of hexachlorobenzene were limited to direct chlorination processes wherein benzene is treated with chlorine until all the available hydrogen atoms on the aromatic ring have been substituted with chlorine atoms.

Hexachlorobenzene is a solid material which has utility in itself as an dielectric material and fungicide. It has further utility as a chemical intermediate, particularly in the manufacture of agricultural chemicals. For example, it is an important intermediate in the manufacture of pentachlorophenol by hydrolysis of one chlorine atom, in the manufacture of hexachlorophenol, and in the manufacture of chloranil. These materials have particular application to bactericide, disinfectant, and fungicide uses.

Benzene hexachloride is a widely used insecticide. However, as obtained by ordinary commercial processes, benzene hexachloride is a mixture of five isomers of 1,2,3,4,5,6-hexachlorocyclohexane, only of which is insecticidally active. This active isomer is referred to as the gamma isomer. These isomers differ only in the stereochemical relationships between the chlorine and hydrogen atoms on the cyclohexane ring. Since benzene hexachloride contains only about 15 percent of the active gamma isomer, the product normally manufactured contains as much as 85 percent of insecticidally inactive benzene hexachlorides. Since chlorine and benzene, which are the important raw materials in the manufacture of benzene hexachloride, are costly as well as strategic materials, it is essential in times of national emergency that an insecticide such as benzene hexachloride when used on a large scale be not wasteful of such important chemicals. Therefore, any process by which the important gamma benzene hexachloride can be utilized as an insecticide without causing a needless expenditure of chlorine and benzene in the form of the ineffective isomers has important implications.

It is an object of my invention to provide a novel chemical reaction. It is a further object of my invention to provide a novel method for the manufacture of hexachlorobenzene. Likewise, it is an object of my process to provide a method of utilizing the gamma isomer of benzene hexachloride economically and provide an equally important outlet for the insecticidally inactive isomers by converting these to the important industrial chemical hexachlorobenzene. Other objects of this invention will be apparent from the further description hereinafter.

The process of my invention is conducted by treating benzene hexachloride in the presence of a catalyst with chlorine wherein the benzene hexachloride is converted to hexachlorobenzene.

I have discovered that at elevated temperatures, whereat benzene hexachloride is molten but below such temperature at which thermal dehydrochlorination of the benzene hexachloride occurs, chlorine causes the aromatization of the benzene hexachloride in substantially quantitative yield. This process is adaptable to both continuous and batch operation.

The process of my invention can be successfully conducted at temperatures as low as about 200° C. and as high as about 350° C. The upper temperature limitation is not critical but is important and is dependent upon the ability of maintaining the reactants and products in a liquid form; that is if temperatures considerably in excess of 350° C. are employed, the product hexachlorobenzene, which is a solid at ordinary temperatures, sublimes and interferes with the evolution of hydrogen chloride and may cause plugging of the reactor system. At temperatures below about 200° C. the reaction does proceed but the rate of reaction is sufficiently slow as to become impractical. My preferred temperature range is between about 220° C. and 280° C.

The proportion of chlorine to benzene hexachloride employed in my process is not critical but is important. I prefer to employ between about 0.70 and 1.0 part of chlorine by weight per part of benzene hexachloride. Although substantial amounts of hexachlorobenzene are produced when the amount of chlorine employed is below 0.70 part per part of benzene hexachloride, the conversion is considerably lower and does not lend itself to commercial operation so readily. With chlorine much in excess of about 1.0 part per part of benzene hexachloride, the amount of unreacted chlorine which must be recovered from the reaction is undesirable.

The pressure employed in conducting my process is not critical although I prefer to employ pressures in the neighborhood of atmospheric so as to reduce the equipment requirements for my process.

In my process I can employ a variety of chemical catalysts, as well as catalysts of a physical nature, such as for example light. It is interesting to note that my process is operable in the presence of catalysts which are considered ordinarily to be either catalysts for the addition chlorination of organic materials or the substitution chlorination of organic materials. It is likewise significant that at temperatures at which my process can operate and in the presence of a catalyst, but in the absence of the chlorine reactant, benzene hexachloride is essentially stable and does not dehydrochlorinate to an appreciable extent. In spite of this, upon the introduction of chlorine to such a system the benzene hexachloride becomes aromatized and the completely chlorinated benzene product is obtained.

Any of the usual chlorination catalysts can be employed in my process for example the iron salts, such as ferric chloride and other halide salts, such as for example antimony trichloride and pentachloride, sulfuryl chloride and various other chlorinating catalysts known to the prior art.

Whereas it may be commercially economical and saving of strategic materials to employ benzene hexachloride from which the gamma isomer has been extracted as a raw material in my process, this so-called waste benzene hexachloride is not essential for this process as I have successfully conducted my process on benzene hexachloride containing all the isomers, or upon mixtures of selected isomers, as well as on individual isomers. In a mixture of isomers of benzene hexachloride it is immaterial in what proportion they occur.

The method of conducting the process of my invention will be more apparent from a consideration of the following working examples wherein all the parts and percentages are by weight. However, these examples are by way of illustration only of typical methods of conducting this process and other methods will be apparent to those skilled in the art.

Example I

In a glass reaction vessel equipped with an agitator and heat transfer means was placed 100 parts of benzene hexachlorides. The temperature of the reactor contents was raised to 240° C. and maintained at this temperature for a period of twelve hours during which time 100 parts of chlorine were introduced. At the end of this period the reaction mixture was allowed to cool and the product which was recovered amounted to 88 parts or a yield of hexachlorobenzene of 60 percent based upon the benzene hexachloride introduced.

Example II

In a vertical cylindrical reactor 300 parts of benzene hexachloride substantially freed from the gamma isomer was treated at a temperature of 240° C. with 0.5 part of ferric chloride and a total of 228 parts of chlorine was introduced for a period of twelve hours. At the end of this period evolution of chlorine from the reaction mass occurred. Upon cooling the reaction mixture to about 25° C. the product consisting of substantially pure hexachlorobenzene was recovered in an amount equivalent to a 96 percent yield based upon the benzene hexachloride introduced to the reactor.

Example III

In the reactor of Example II was placed 500 parts of benzene hexachloride obtained by the additive chlorination of benzene and at a temperature between 227 and 270° C. in the presence of one part of ferric chloride was introduced 387 parts of chlorine over a period of five hours. Before the end of this period chlorine was evolved from the reaction mixture and recovered. By difference it was established that 366 parts of chlorine had reacted and the product which was recovered upon cooling the molten reaction mixture corresponded to a 96.5 percent yield of hexachlorobenzene.

In processes similar to Example III equally good results are obtained when the ferric chloride catalyst is replaced by, for example, elemental catalysts such as antimony, iron, aluminum, arsenic, bismuth, and tin, and the halides and oxyhalides thereof.

Example IV

In a glass reaction vessel was placed 1000 parts of benzene and, while illuminating the benzene with a daylight fluorescent lamp, a total of 300 parts of chlorine was introduced while maintaining the temperature of the reaction mixture at 50° C. over a period of thirty minutes. At the end of this time the unreacted benzene was removed by flash vaporization and the resulting molten residue of benzene hexachloride was cooled to about 25° C. This solid product, 400 parts, was treated with 100 parts of methanol at a temperature of 25° C. with agitation. The resulting slurry was filtered and the residue so obtained, which was 300 parts, was treated according to the procedure of Example III and the hexachlorobenzene recovered therefrom. The filtrate from the above methanol extraction was charged to an evaporator at a temperature of 90° C. Following crystallization and filtration 20 parts of gamma benzene hexachloride were obtained of 99 percent purity.

Having thus described typical methods of producing hexachlorobenzene by the process of my invention and one method of the conjoint manufacture therewith of the gamma isomer of benzene hexachloride, I do not intend that my invention be limited in scope except as by the appended claims.

I claim:

1. A process for the manufacture of hexachlorobenzene comprising treating benzene hexachloride with chlorine in the presence of a catalyst selected from the group consisting of antimony, iron, aluminum, arsenic, bismuth and tin and the halides and oxyhalides thereof at a temperature between about 200° C. and 350° C. until a substantial proportion of hexachlorobenzene is produced.

2. The process of claim 1 wherein the process is carried out at a temperature between 220° and 280° C. and in which between about 0.70 and 1.0 part of chlorine by weight is employed per part of benzene hexachloride.

3. The process of claim 1 wherein the catalyst contains iron.

4. The process of claim 1 in which the catalyst contains aluminum.

5. The process of claim 1 wherein the catalyst contains antimony.

6. The process of claim 1 wherein the catalyst contains bismuth.

7. The process of claim 1 wherein the catalyst contains tin.

8. The process of claim 1 wherein the catalyst is an iron compound.

9. A process for the manufacture of hexachlorobenzene comprising treating benzene hexachloride with chlorine in the presence of ferric chloride at a temperature between 200° and 245° C. until a substantial proportion of hexachlorobenzene is produced.

10. A process for the manufacture of hexachlorobenzene which comprises treating a benzene hexachloride product from which the gamma isomer has been substantially removed with chlorine in the presence of a catalyst selected from the group consisting of antimony, iron, aluminum, arsenic, bismuth and tin and the halides and oxyhalides thereof at a temperature of between about 200° C. and 350° C.

11. A dual process for the manufacture of gamma benzene hexachloride and hexachlorobenzene which comprises forming the addition product of benzene and chlorine, removing a substantial portion of the gamma benzene hexachloride from said addition product and treating said resulting benzene hexachloride with chlorine in the presence of a catalyst selected from the group consisting of antimony, iron, aluminum, arsenic, bismuth and tin and the halides and oxyhalides thereof at a temperature between about 200° C. and about 350° C.

References Cited in the file of this patent

Van der Linden: "Rec. des Trav. Chim. des Pays-Bas," vol. 57, pages 217–224 (1938).